(12) United States Patent
Brauns et al.

(10) Patent No.: US 11,953,203 B2
(45) Date of Patent: Apr. 9, 2024

(54) FLAME MODULE FOR A SPECTROMETER

(71) Applicant: Thermo Fisher Scientific (Bremen) GmbH, Bremen (DE)

(72) Inventors: Eike Brauns, Bremen (DE); Leanne Verster, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 477 days.

(21) Appl. No.: 17/251,685

(22) PCT Filed: Jun. 24, 2019

(86) PCT No.: PCT/EP2019/065676
§ 371 (c)(1),
(2) Date: Dec. 11, 2020

(87) PCT Pub. No.: WO2019/238923
PCT Pub. Date: Dec. 19, 2019

(65) Prior Publication Data
US 2021/0207802 A1     Jul. 8, 2021

(30) Foreign Application Priority Data
Jun. 15, 2018 (GB) ..................... 1809870

(51) Int. Cl.
*F23N 5/18* (2006.01)
*F23N 1/00* (2006.01)
(Continued)

(52) U.S. Cl.
CPC ............... *F23N 5/18* (2013.01); *F23N 1/005* (2013.01); *F23N 1/045* (2013.01); *F23N 3/005* (2013.01);
(Continued)

(58) Field of Classification Search
CPC . F23N 5/18; F23N 5/245; F23N 1/005; F23N 1/045; F23N 1/025; F23N 3/005;
(Continued)

(56) References Cited

U.S. PATENT DOCUMENTS 3,056,398 A * 10/1962 Kirk ...................... F24H 9/2085
431/31
3,524,717 A * 8/1970 Cade ...................... F23N 5/203
431/29
(Continued)

FOREIGN PATENT DOCUMENTS

CA         2920903 C  *  1/2018 ............. F23D 14/32
CN      201508324 U      6/2010
(Continued)

OTHER PUBLICATIONS

Combined Search and Examination Report dated Dec. 12, 2018, to GB Patent Application No. 1809870.7.
(Continued)

*Primary Examiner* — Steven B McAllister
*Assistant Examiner* — Daniel E. Namay

(57) ABSTRACT

A gas supply system for a flame module of a spectrometer and a method of controlling a flame module. The gas supply system comprises an oxidant gas supply line for providing a supply of oxidant gas, an oxidant gas flow valve for varying a gas flow rate of an oxidant gas in the oxidant gas supply line, an oxidant gas safety controller configured to control the oxidant gas flow valve, a fuel gas supply line for providing a supply of fuel gas, a fuel gas flow valve configured to control a gas flow rate of a fuel gas on the fuel gas supply line, and a fuel gas safety controller configured to control the fuel gas flow valve. During normal operation, the oxidant gas safety controller is configured to charge an energy storage circuit of the oxidant gas safety controller. In the event of a power failure, a first switch of the oxidant gas
(Continued)

safety controller is configured to connect the energy storage circuit to the oxidant gas flow valve, wherein the energy storage circuit is configured to discharge energy to the oxidant gas flow valve to increase the oxidant gas flow rate in order to extinguish a flame of the flame module, and the fuel gas safety controller is configured to close the fuel gas flow valve.

15 Claims, 8 Drawing Sheets

(51) Int. Cl.
*F23N 1/04* (2006.01)
*F23N 3/00* (2006.01)
*F23N 3/06* (2006.01)
*F23N 3/08* (2006.01)
*F23N 5/24* (2006.01)
*G01N 21/72* (2006.01)

(52) U.S. Cl.
CPC ............. *F23N 3/06* (2013.01); *F23N 3/085* (2013.01); *F23N 5/245* (2013.01); *G01N 21/72* (2013.01); *F23N 2231/02* (2020.01); *F23N 2231/04* (2020.01); *F23N 2231/10* (2020.01); *F23N 2237/16* (2020.01); *F23N 2239/04* (2020.01); *F23N 2241/16* (2020.01); *F23N 2900/05005* (2013.01)

(58) Field of Classification Search
CPC ........ F23N 3/06; F23N 3/085; F23N 2231/02; F23N 2231/04; F23N 2231/10; F23N 2231/06; F23N 2231/28; F23N 2241/16; F23N 2239/04; F23N 2900/05005; F23N 2237/16; F23N 5/184; F23N 5/187; F23N 5/188; F23N 1/002; F23N 1/007; F23N 1/027; F23N 1/042; F23N 1/047; F23N 3/065; F23N 3/082; F23N 3/087; G01N 21/72
USPC ................................................. 431/16, 6, 33
See application file for complete search history.

(56) References Cited

U.S. PATENT DOCUMENTS

| | | | | |
|---|---|---|---|---|
| 4,363,440 | A | * | 12/1982 | Broach ................... F23N 1/105 431/12 |
| 4,606,718 | A | * | 8/1986 | Kendall-Tobias ..... G01N 21/72 356/417 |
| 4,617,953 | A | * | 10/1986 | Kendall-Tobias ... G05D 7/0113 137/110 |
| 6,205,841 | B1 | | 3/2001 | Shibamoto |
| 2014/0080072 | A1 | * | 3/2014 | Smirnov ................. F23D 14/66 431/6 |

FOREIGN PATENT DOCUMENTS

| | | | | |
|---|---|---|---|---|
| DE | 2845426 | A1 | * 10/1978 | ............ G01N 21/72 |
| EP | 0182258 | A1 | 5/1986 | |
| EP | 0182259 | A1 | 5/1986 | |
| JP | 60011016 | A | * 6/1983 | ............ F23N 1/002 |
| JP | S6011016 | A | * 6/1983 | ............ F23N 1/002 |
| JP | S5979839 | A | 5/1984 | |
| JP | 2010078577 | A | 4/2010 | |
| WO | WO-8202758 | A1 | * 8/1981 | ............... F23N 1/00 |
| WO | 02014839 | A1 | 2/2002 | |

OTHER PUBLICATIONS

International Search Report and Written Opinion dated Sep. 24, 2019, to PCT Application No. PCT/EP2019/065676.

* cited by examiner

FLAME MODULE FOR A SPECTROMETER

CROSS-REFERENCE TO RELATED APPLICATIONS

This application is a National Stage application filed under 35 USC § 371 of International Patent Application No. PCT/EP2019/065676, filed on Jun. 14, 2019. PCT Application No, PCT/EP2019/065676, claims priority to GB 1809870.7, filed Jun. 15, 2018, both of which are incorporated by reference herein in their entirety.

FIELD OF THE DISCLOSURE

The present disclosure relates to spectrometers using a flame module, in particular atomic absorption spectrometers (AAS) and atomic emission spectrometers (AES). In particular, the present disclosure relates to flame modules for such spectrometers.

BACKGROUND

Atomic absorption spectrometry (AAS) and atomic emission spectrometry (AES) are known analytical techniques for determining concentrations of elements within a sample.

The techniques of AAS and AES are dependent on the principle that elements in an atomic form have discrete energy levels and will absorb or emit energy by the absorption or emission of photons of specific wavelengths corresponding to those discrete energy levels. The photons may have any wavelength of the electromagnetic spectrum and may belong to e.g. the visible light spectrum. Each atomic element has a unique plurality of discrete energy levels which are related to the shell structure and the energy levels of its electrons. Accordingly, the wavelength(s) of light absorbed or emitted by an atom will be indicative of the discrete energy levels and may be used to identify a particular element. Furthermore, the amount of light absorbed or emitted is proportional to the number of atoms present, and so the quantity (concentration) of atoms present in a sample may also be determined.

A typical AAS system comprises a light source for providing a light source of a known wavelength e.g. a Hollow Cathode Lamp (HCL), an atomiser for atomising a sample to be measured, a monochromator and a light detector.

Light emitted from an HCL source (sample light) may be passed through an atomiser providing an atomised sample to be analysed from a supplied sample. As the sample light passes through the atomised sample, a proportion of the sample light may be absorbed by the atomised sample if the wavelength of the light matches a discrete energy level of the atomised sample. The sample light not absorbed by the atomised sample is then filtered by a monochromator to separate the wavelength(s) of interest for the element to be detected from other wavelengths. The final light signal is focused on a photodetector in order to measure the signal. Based on the intensity of the light having the wavelength(s) (and corresponding photon energy E according to the Planck-Einstein relation $E=h*v$) indicative of the sample element received, a concentration of the element in the sample can be determined.

In order to analyse a sample using AAS, the sample is atomised using a sample atomiser. One known type of sample atomiser is a flame module (burner) which provides a flame for atomising a sample.

Typically, a flame module includes a burner head and a chamber (e.g. a spray chamber). The chamber of a flame module may be supplied with an aerosol. The aerosol may be a mixture of an oxidant fluid, a fuel fluid, and the sample to be analysed. The sample may be provided in form of droplets. The droplets of the sample are typically provided to the chamber by a nebuliser. Alternatively a gaseous sample can be supplied to the chamber.

The burner head may comprise a slit having a lateral extension of typically 5 to 10 cm and a width of a few mm. The aerosol mixture in the chamber of the burner may flow from the chamber through the slit, where it may be ignited to form a flame. The flame of the burner is arranged to extend away from the burner head as a result of the direction of flow of the aerosol and may be not in direct contact with the burner head. It is important that the flame does not enter the chamber of the flame module. The shape of the flame is determined by the dimensions of the slit of the burner head.

The sample is atomised in the flame. The light signal of the sample light may be directed through the flame such that the atomised sample can absorb the sample light. The light beam of the sample light of an AAS passes through this flame at its longest axis, and the flame gas flow-rates may be adjusted to produce the highest concentration of free atoms.

Also in an atomic emission spectrometer (AES) the sample has to be atomised in a sample atomiser, which can be a flame module. The single atoms created in the flame are in an excited energy level of its electrons and emit photons when falling back to a lower energy level. These emitted photons are then measured using a monochromator and a photon detector.

The burner head is supplied with a combination of gases to produce a flame. Typically, a fuel gas and an oxidising gas are provided. One known combination is acetylene gas (fuel gas) in combination with air (oxidising gas), which may produce a flame with a temperatures typically in a range between 1000° C. and 2500° C., preferably in a range between 1200° C. and 2150° C. An alternative gas combination is acetylene gas with nitrous oxide, which may produces a flame with a temperature of in a range between 2500° C. and 3400° C., preferably in a range between 2700° C. and 3200° C.

Though very high flame temperatures can be used in atomic absorption spectrometer (AAS) and atomic emission spectrometer (AES), it is still possible that not all atoms of sample are atomised in some experiments. The molecular spectra of these residual molecules belong to the background signals of the measured spectra and can be separated by the background corrections used in AAS and AES.

Liquid or dissolved samples are typically used with flame atomizers. The sample solution may be aspirated, for example by a pneumatic analytical nebulizer, and transformed into droplets, which is then introduced into the spray chamber, e.g. by suction using the jet effect known form jet pumps or a spray process. In the spray chamber the sample is mixed with the flame gases and conditioned in a way that preferably only the finest aerosol droplets (<10 μm) enter the flame.

The gases used in the burner of the flame module are typically supplied from a supply of stored gases (e.g. bottled compressed gas). Accordingly, gas flow from the supply of stored gases to the burner head is typically controlled by mechanical flow restricting valves. These valves may be electronically actuated such that the gas flow can be electronically controlled by a controller (e.g. a microprocessor).

In the event of an unexpected shutdown of the spectrometer (e.g. caused by a power failure), the electronic control signal provided to the mechanical flow restricting valves of the flame module may fail. In such an event, uncoordinated shut down of the mechanical flow restricting valves may result in a flash back event occurring. In one example of a flash back event, a pressure differential between the oxidant gas supply and the fuel gas supply may occur. The pressure differential may be due to a decreasing gas flow rate, or an interruption in one or more of the oxidant and/or fuel gas supplies caused by the power failure. A flash back event may also be caused by a stop of the oxidant gas supply and fuel gas supply (e.g. due to a power failure). This may cause the flame to travel inside the burner or towards the supply/supplies of stored gas. For example, an interruption in the supply of oxidant gas or fuel gas supply may cause such a pressure differential. A flash back event might also occur, if some residual oxidant gas and fuel gas remain in the chamber of the burner and the flame of the burner is ignited. Such flash back events run the risk of causing significant damage to the system.

A schematic diagram for a gas supply system to a known burner module is shown in FIG. 1. The diagram shows a plurality of normally open, electronically actuated mechanical flow valves (SV1, SV2). In this system, to reduce the risk of flash back occurring, capacitors (C22, C23) are provided in parallel with the electronic actuators of the mechanical flow valves. These capacitors are charged by the electronic power used to open (drive) the actuators in normal use, such that in the event of a power failure, the charged capacitor can be discharged to briefly maintain power to the electronic actuators of each mechanical flow restricting valve. Thus, the capacitors may be used to gradually close the mechanical flow restricting valves. The size of each capacitor can be selected in combination with the known resistance of the mechanical flow restricting valve to provide a known discharging rate such that the mechanical flow restricting valve can be controlled in a predetermined manner.

For example, FIG. 2 shows a graph of gas flow rates over time for acetylene gas and air gas in the event of a power failure (time T1). The gas flow rates are controlled using capacitors C22, C23 as discussed above. The capacitors are chosen such that the acetylene gas flow rate is reduced at a faster rate than the air gas flow rate. As such, the system ensures that the flame runs dry (fuel lean atmosphere) as part of the shut down procedure. Thus, the likelihood of a flashback event occurring may be reduced.

The present inventors have realised that it is desirable to improve the control of gas flow into the burner head. However, any modifications to the flow restricting valves must not increase the risk of flash back occurring in the event of a power failure.

SUMMARY OF THE INVENTION

The present inventors have realised that the gas flow in the system of FIG. 1 is only controlled by mechanical flow restricting valves which can be only fully opened or fully closed. The capacitors for the fuel gas supply and the oxidant gas supply are both charged with the supply voltage to fully open the mechanical flow restricting valves. The fuel lean (dry) atmosphere is provided in the event of a power failure by the higher capacitance of the capacitor for the oxidant gas supply compared to the capacitance of the capacitor the fuel gas supply, by which the mechanical flow restricting valves of the oxidant gas supply are for a longer time fully opened after the event of the power failure.

The present inventors have realised that it would be desirable to incorporate variable gas flow rate control into a flame module. To control the flow rate of gas through a gas valve, a gas flow controller is desirable. Such gas flow controllers typically include feedback in order to accurately control the gas flow rate through the gas valve. Often, the gas valve and controller may be combined in a single unit (module).

One known type of combined variable gas flow rate valve and controller module is a mass flow controller (MFC). MFCs typically include a variable gas flow rate valve and means for sensing the flow of gas through the valve in order to accurately control the gas flow rate. One problem with such systems is that the controller of the MFC is also reliant on a power supply in order to operate correctly. Further, MFC modules may include their own firmware, which may not be readily modifiable to comply with and/or co-operate with other safety measures in the system. In particular, it is not possible to add to a mass flow controller the safety system for a power failure of the above system, which means to charge capacitors with the supply voltage of the variable gas flow rate valves, because these voltage varies with the time and is not correlated to a defined, particular fully opened, status of the gas flow rate valves.

It will be appreciated, that safe shut down of a burner of a flame module must be single fault safe. As such, safe shut down must be ensured by hardware of the system, and should not be reliant on firmware of individual components.

Accordingly, the present inventors have developed a new gas valve arrangement for a flame module of a spectrometer, which aims to further reduce the risk of flash back occurring.

According to a first aspect of the disclosure, a gas supply system for a flame module of an atomic absorption spectrometer is provided. The gas supply system comprises an oxidant gas supply line for providing a supply of oxidant gas, an oxidant gas flow valve for varying a gas flow rate of an oxidant gas in the oxidant gas supply line, and an oxidant gas safety controller. The oxidant gas safety controller is configured to control the oxidant gas flow valve and comprises a first switch, and an energy storage circuit. During normal operation, the oxidant gas safety controller is configured to charge the energy storage circuit. In the event of a power failure (i.e. not during normal operation), the first switch of the oxidant gas safety controller is configured to connect the energy storage circuit to the oxidant gas flow valve, wherein the energy storage circuit is configured to discharge energy to the oxidant gas flow valve to increase the oxidant gas flow rate in order to extinguish a flame of the flame module. The system gas supply system also comprises a fuel gas supply line, a fuel gas flow valve configured to control a gas flow rate of a fuel gas on the fuel gas supply line; and a fuel gas safety controller configured to control the fuel gas flow valve. In the event of a power failure, the fuel gas safety controller is configured to close the fuel gas flow valve.

Advantageously, the first switch of the oxidant gas safety controller is configured to connect the energy storage circuit to the oxidant gas flow valve in the event of a power failure. Through discharging energy the oxidant gas flow valve may be further opened so as to increase the oxidant gas flow rate through the oxidant gas supply line. For example, the energy storage circuit may provide sufficient energy (i.e. voltage, current) to cause the oxidant gas flow valve to fully open. As such, the oxidant gas flow rate may be significantly increased with respect to the fuel gas flow rate (which is decreased) such that the ratio of oxidant gas to fuel gas in the flame module is dramatically changed in order to extinguish the flame. It will be appreciated that such an increase in the oxidant gas flow rate will blow out the flame on the flame module.

Further, during normal operation, the gas flow safety controller charges the energy storage circuit. Thus, the energy storage circuit is not charged by a control signal which is used to control the oxidant gas flow valve on the first gas supply line. As such, it will be appreciated that such a control signal may be provided independently to the energy storage circuit.

Accordingly, the first aspect of this disclosure provides a gas supply system which is arranged to increase the oxidant gas flow rate in response to a power failure. Thus, the flame of the flame module may be extinguished rapidly by the increase in the oxidant gas flow rate, rather than a gradual burning off of the fuel as the both gas flow valves gradually close. As the flame is immediately (rapidly) extinguished in response to a power failure, the risk of flash back is further reduced as flash back cannot occur if the flame is not present.

Preferably, the gas supply system includes an oxidant gas flow controller for setting the gas flow rate of oxidant gas in the oxidant gas supply line. The oxidant gas flow controller is connected to the oxidant gas safety controller. During normal operation, the first switch of the oxidant gas safety controller is configured to connect the oxidant gas flow controller to the oxidant gas flow valve.

Advantageously the oxidant gas flow controller may be provided independently of the oxidant gas safety controller such that said signal is independent of the charging signal to the energy storage circuit.

Preferably, the fuel gas safety controller further comprises a second switch, and a fuel gas safety circuit. In the event of a power failure, the second switch of the fuel gas safety controller is configured to connect the fuel gas safety circuit to the fuel gas flow valve to close the fuel gas flow valve. Preferably, the fuel gas safety circuit comprises a short circuit or an open circuit during normal operation. If the fuel gas safety circuit comprises an open circuit during normal operation, it is further preferable that a diode is connected across the fuel gas flow valve to reduce or eliminate the generation of sparks in the event of a power failure.

In some embodiments, the fuel gas safety controller and the oxidant gas safety controller may be combined (integrated) as a gas safety controller. Advantageously, as the oxidant flow valve is controlled to increase the oxidant gas flow rate in order to extinguish the flame rapidly, the fuel gas flow valve may be closed rapidly, without regard to the oxidant gas flow rate. As the flame will be extinguished by the increase in the oxidant gas flow rate, a capacitor is not required to control the fuel gas flow valve in order to provide a controlled gradual shut down as the flame is extinguished.

It is particularly preferable that the oxidant gas flow controller and/or the fuel gas controller are each provided by a mass flow controller (MFC). The oxidant gas flow valve and/or the fuel gas flow valve may also be provided by said MFC. As such, the first aspect of this disclosure may incorporate one or more MFCs for controlling the fuel gas flow rate and the oxidant gas flow rate. As such, variable flow rate control of the oxidant gas and the fuel gas may be provided whilst also reducing or eliminating the risk of flash back. Furthermore, controlling the oxidant and/or fuel gas flow with MFCs may result in a higher repeat accuracy and temperature independency of the measurements with a spectrometer possessing a flame module.

Preferably, the gas supply system also comprises a fuel gas flow controller for setting the gas flow rate of the fuel gas in the fuel gas supply line. During normal operation, the second switch of the fuel gas safety controller is configured to connect the fuel gas flow controller to the fuel gas flow valve. Thus, the fuel gas flow rate may be variably controlled during normal operation, whilst the safety control functionality is provided independently.

Preferably, the oxidant gas safety controller and/or the fuel gas safety controller further comprise a control signal input configured to receive a control signal. The oxidant gas safety controller and/or the fuel gas safety controller are configured to operate the first and/or second switches from the respective first positions to the respective second positions in response to receiving the control signal. The control signal may be used to switch the oxidant gas safety controller and/or the fuel gas safety controller between a safe mode in which the gas flow valves may not be operated and a powered mode in which the gas flow valves may be controlled (i.e. operated). It will be appreciated that in the event of a power failure the system is nevertheless arranged to ensure that the first switch connects the energy storage circuit to the oxidant gas flow valve in order to extinguish the flame.

Preferably, the gas supply system comprises an alternative oxidant gas supply line for providing a supply of an alternative oxidant gas, a three way valve arranged upstream of the oxidant gas valve connected to the oxidant gas supply line and the alternative oxidant gas supply line and a third switch connected to the three way valve. During normal operation, the third switch is configured to control the three way valve to fluidly connect either the oxidant gas supply line or the alternative oxidant gas supply line to the oxidant gas valve. In the event of a power failure, the third switch is configured to control the three way valve to fluidly connect the oxidant gas supply line to the oxidant gas valve. Preferably, the oxidant gas supply line provides a supply of air. Thus, the gas supply system may also incorporate a third gas supply line for providing a supply of an alternative oxidant gas, for example nitrous oxide. Accordingly, the system may provide a flame from, for example, a fuel mixture of acetylene gas and air (oxidant gas), or a fuel mixture of acetylene and nitrous oxide (alternative oxidant gas) to produce flames with different temperatures. The desired fuel mixture may be controlled by the operation of the three way valve. However, in the event of a power failure the gas safety controller ensures that the most suitable oxidising gas is used to extinguish the flame. For example, in one embodiment the third switch of the gas flow safety controller may control the three way valve to fluidly connect the first gas supply line supplying air to the oxidant gas valve for extinguishing the flame. In other embodiments, a different gas may be used to extinguish the flame.

Preferably, the first switch, the second switch and/or the third switch is a relay. Relays are particularly well suited to safety critical switching applications. This is because relays are well known for their predictable behaviour and reliability and (fail safe). Of course it will be appreciated that other switching elements (switches) may be used. For example, in some applications, a triiac, a transistor, or a thyristor may be suitable.

In an embodiment of the gas supply system the first switch and the second switch may be connected. In a preferred embodiment of the gas supply system, the first switch and the second switch may be provided by a single switch. As such, the first switch and the second switch may be provided by a single electronic component (e.g. a relay). In a preferred embodiment of the gas supply system the first switch and the second switch are realised by one relay. The relay, in the event of a power failure, is configured to switch back to a first position, in which it is configured to connect the energy storage circuit to the oxidant gas flow valve and to closing the fuel gas flow valve.

Preferably, the first energy storage circuit comprises a capacitor.

According to a second aspect of the disclosure, an oxidant gas safety controller for a flame module is provided. The oxidant gas safety controller comprises an oxidant gas valve signal output configured to output an oxidant gas valve signal to an oxidant gas valve for controlling the flow rate of an oxidant gas through the oxidant gas valve. The oxidant gas safety controller also comprises a first switch, and a first energy storage circuit. The oxidant gas safety controller is configured to charge the first energy storage circuit when the first switch is powered. The oxidant gas safety controller is also configured to discharge the first energy storage circuit through the oxidant gas valve output as the oxidant gas valve signal to increase the flow rate of the oxidant gas through the oxidant gas valve when the first switch is switched from a powered state to an unpowered state.

It will be appreciated that the advantages and optional features of the first aspect may also be applied to the second aspect of this disclosure.

According to a third aspect of this disclosure a method for controlling a flame module is provided. The method comprises providing a supply of oxidant gas at a first flow rate and a supply of fuel gas at a second flow rate to a burner head where a flame is present. In response to an interruption in the supply of power to the flame module, the method includes reducing the flow rate of the supply of fuel gas such that it is shut off, and increasing the flow rate of the supply of oxidant gas, such that the flame is extinguished.

Preferably, a period of time to reduce the flow rate the supply of fuel gas to be shut off is no greater than 300 ms, preferably no greater than 200 ms and particular preferably no greater than 50 ms. As such, it will be appreciated that in the event of a power failure, the supply of fuel gas is arranged to be shut off relatively rapidly. For example, a fuel gas flow valve may be provided in a normally closed configuration, such that in the absence of power, the fuel gas flow valve closes rapidly. It is important, that by the shut off it is achieved, that no longer a flammable mixture is present in the chamber of the flame module. In a preferred embodiment the flow rate of the fuel gas valve is reduced in period of time to reduce the flow rate the supply of fuel gas to be shut off below 0.5% of the maximum flow rate of the fuel gas valve and in a particular preferred flow rate below 0.05% of the maximum flow rate of the fuel gas valve.

Preferably, the flow rate of the supply of oxidant gas is increased to a third flow rate to extinguish the flame, the third flow rate being greater than or equal to the sum of the first flow rate and the second flow rate. As such, in the event of a power failure, the supply of oxidant gas is arranged to increase by at least the same flow rate as the corresponding drop in fuel gas flow rate (i.e. the total gas flow rate is substantially equal or greater). Thus, the flame may be extinguished and a risk of a flashback occurring is further reduced.

Preferably, the supply of oxidant gas is held at the third flow rate for a hold period of at least 0.5 seconds. Preferably the hold period is no greater than 5 seconds. More preferably, the hold period is in the range 1 second to 3 seconds. Thus, a period of time is provided to ensure that the flame is extinguished. Following this hold period, the oxidant gas flow rate may then be reduced.

It will be appreciated that the advantages and optional features of the first aspect and/or the second aspect may also be applied to the third aspect of this disclosure as equivalent method features.

BRIEF DESCRIPTION OF THE FIGURES

Embodiment of the present disclosure will now be described with reference to the accompanying figures in which.

DETAILED DESCRIPTION

According to an embodiment of this disclosure, a flame module 1 is disclosed.

Figure 1:
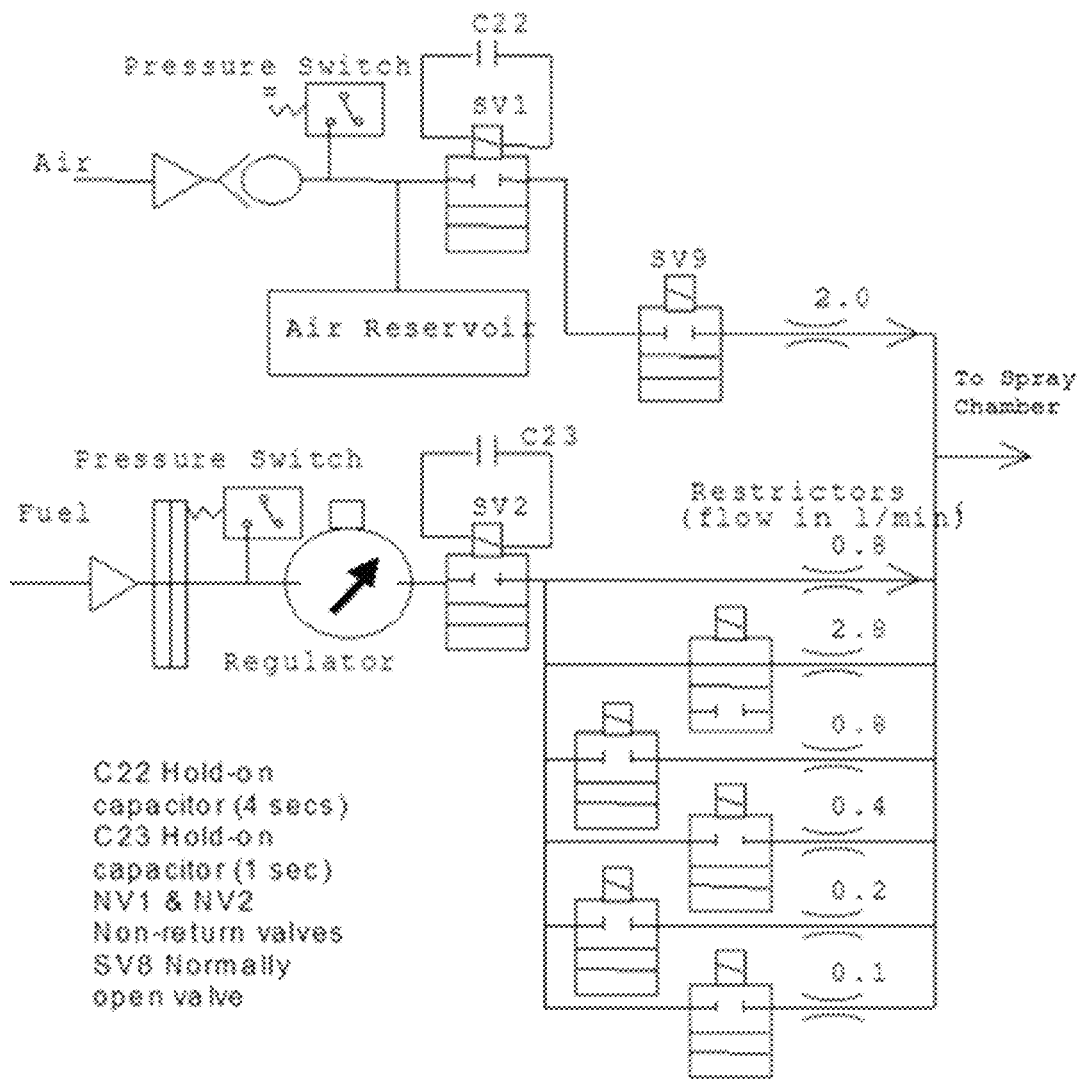
FIG. 1 shows a schematic diagram of a gas supply system for a burner module known in the prior art.
Figure 2:
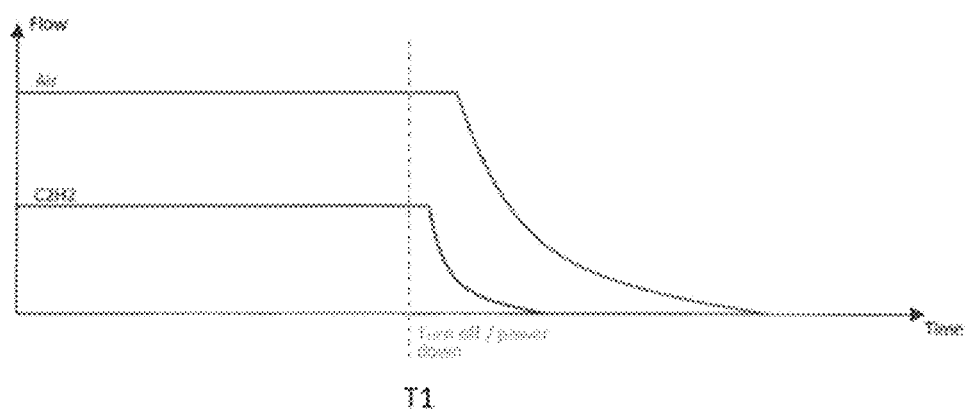
FIG. 2 shows a graph of gas flow rates over time for acetylene gas and air gas in the event of a power failure (time T1) for the prior art system.
Figure 3:
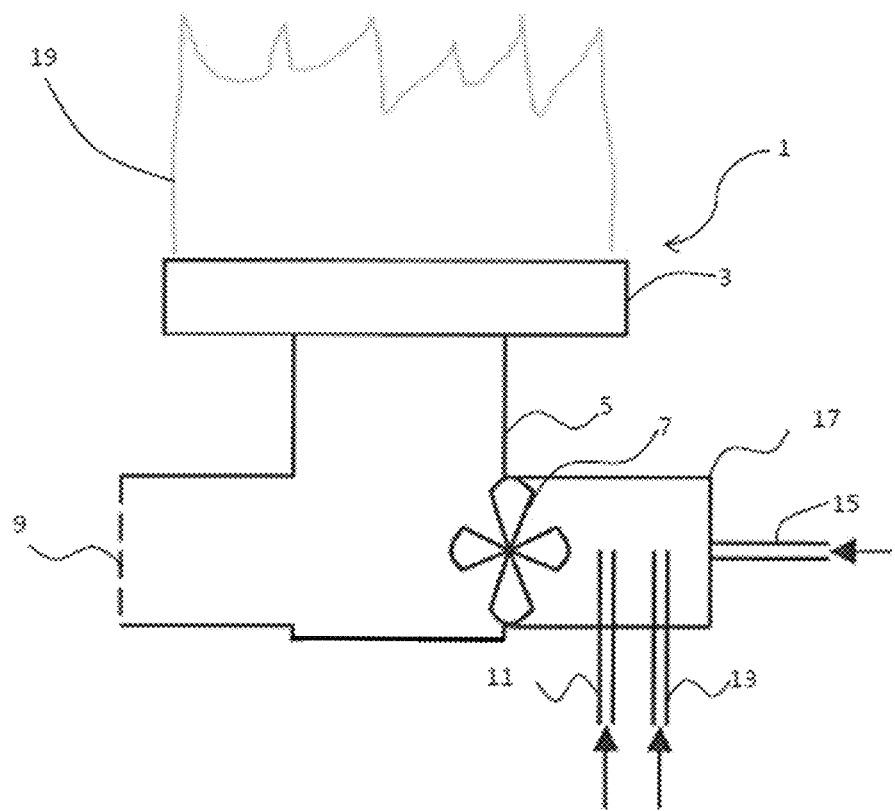
FIG. 3 shows a schematic diagram of a flame module according to an embodiment of this disclosure.

FIG. 3 shows a schematic diagram of the flame module according to an embodiment of this disclosure. The flame module 1 comprises a burner head 3, a spray chamber 5, a mixer 7, and a membrane 9. Gases for combustion are supplied to the spray chamber 5 by a fuel supply tube 11, an oxidant supply tube 13, and a sample supply tube 15.

Fuel supply tube 11 is connected to a source of fuel gas such that a fuel gas may be supplied to the spray chamber 5. For example, the fuel supply tube 11 may be connected to a supply of acetylene gas for use as a fuel gas in the flame module. Other fuel gasses, which can be used are e.g. hydrogen, methane, ethylene, propane and cyanogen.

The oxidant supply tube 13 may be connected to a supply of oxidant gas. For example, the supply of oxidant gas may be a source of air (compressed air), a source of nitrous oxide gas or a source of oxygen.

In general, the fuel gas and oxidation may by selected taking into account the kind to sample which shall be investigated and the temperature of the flame required to atomise the sample at least nearly completely, preferably to atomise the sample completely.

The sample supply tube 15 may be connected to a source of sample to be analysed by the flame module/atomic absorption spectrometer or atomic emission spectrometer. The sample supplied along sample supply tube 15 may be in the form of an aerosol provided by a pneumatic analytical nebuliser which is configured to aspirate a liquid sample or a sample dissolved in a solvent. For example the liquid sample may be supplied by a LC (liquid chromatography) system, in particular a high pressure LC system. Also gaseous samples may be supplied to the chamber of the flame module, e.g. from a GC (gas chromatography) system.

As shown in the schematic diagram of FIG. 3 the sample supply tube 15, fuel supply tube 11, and oxidant supply tube 13 are arranged to supply their respective gases and aerosols or fine droplets of a spray process applied to a liquid sample to an injection portion 17 of the spray chamber 5. The injection portion 17 forms one portion of the total volume enclosed by spray chamber 5. In spray chamber 5, a mixer 7 is disposed between the remaining volume of the spray chamber 5 and the gas injection portion 17. Mixer 7 is provided to encourage the mixing of the combustion gases (fuel gas, oxidant gas, and sample gas, aerosol or droplets). As shown in the embodiment of FIG. 3, the mixer 7 has the shape of a propeller. The propeller is configured to create turbulences in the flow of combustion gases to increase the mixing process, wherein the combustion gases flow from the gas injection portion 17 through spray chamber 5 to the slit of the burner head 3. The mixture of combustion gases flows from the injection portion 17 of the spray chamber 5 through the mixer 7 to the burner head 3 where it may be ignited by ignition means (not shown). Thus, as shown in FIG. 3 a flame 19 is formed on an external surface of the burner head 3 (that is extending away from spray chamber 5). When used in an AAS, it is understood that the sample light may be passed through the flame 19 in order to interact with the atomised sample present within the flame 19. One or more non-return valves (not shown) may be fitted to each of the fuel supply tube 11, oxidant supply tube 13, and sample supply tube 15 to reduce and/or prevent the unintended flow of fluid.

The membrane 9 which is attached to at least part of the outer surface of the spray chamber 5 is provided to reduce damage to the spray chamber in the event of a flash back. The membrane is configured to expand in response to an increase in pressure in the spray chamber 5, thus reducing and/or preventing damage to other components of the flame module and/or gas supply system. Preferably, the membrane is a non-elastic membrane. As such, the membrane is configured to irreversibly expand, or even explode, in the event of a flashback. Such membranes may be replaceable following a flashback event. As such the membrane forms an expandable part of the spray chamber, in order to prevent further damage to the spray chamber in the event of a flashback. In some embodiments, the membrane may be constructed from a Polytetrafluoroethylene (PTFE) material with a thickness of about 0.05 mm. The membrane may have a diameter of about 5 cm (depending on the size of the spray chamber).

The flame module 1 may be provided in an enclosure (i.e. housing) to isolate the flame and the sample light from outside environmental interference and for the safety of the operator.

Figure 6A:
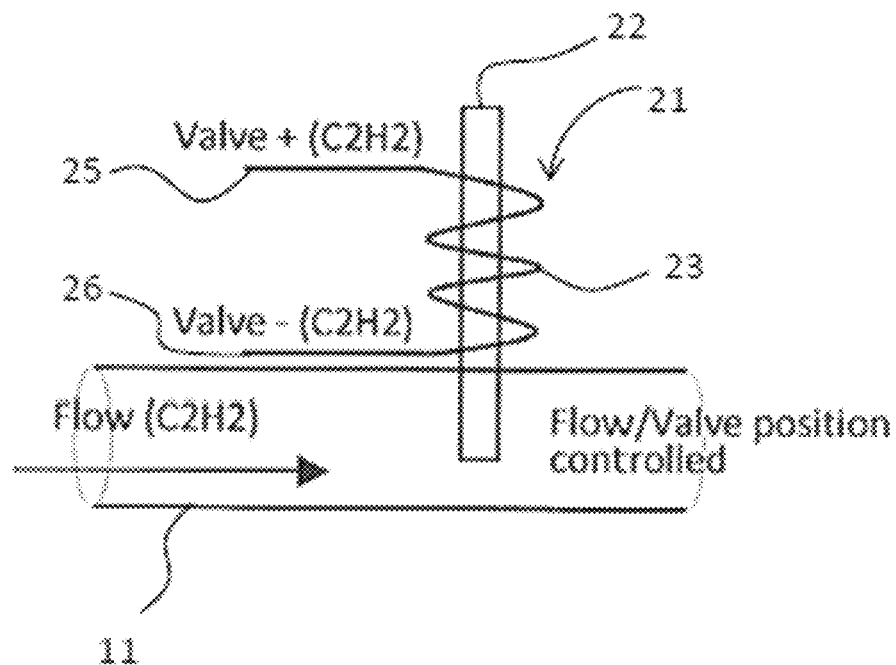
FIG. 6a shows a schematic diagram of a fuel gas valve in a normal operation configuration.
Figure 9A:
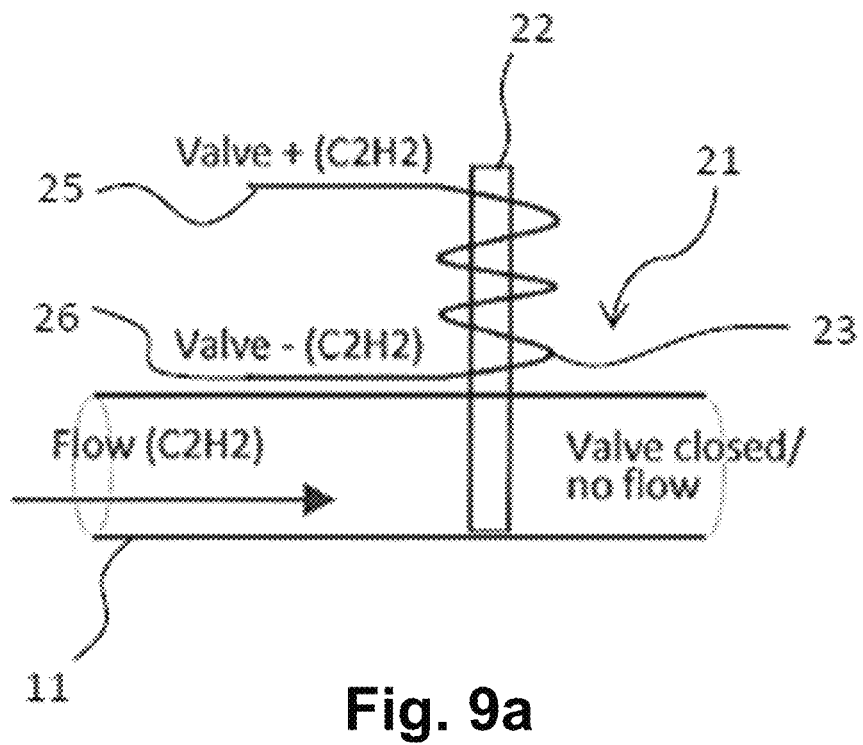
FIG. 9a shows a schematic diagram of a fuel gas valve in a power failure configuration.

The supply of fuel gas along fuel supply tube 11 is controlled by a fuel gas valve 21. An example of the fuel gas valve 21 is shown in FIGS. 6a and 9a. Fuel gas valve 21 may be an electronically actuated gas valve. As such, fuel gas valve 21 may be controlled (operated, actuated) by an electronic signal. Fuel gas valve 21 is disposed at a point along fuel supply tube 11 in order to control the flow of gas (i.e. the fuel gas flow rate) along the fuel supply tube 11. The fuel gas valve 21 may be electronically controlled (actuated) to vary the rate of gas flow along the fuel supply tube for a range of different values of gas flow rate. For example, in one embodiment, the fuel gas valve 21 may be provided to control the rate of fuel gas flowing along the fuel supply tube between 0 slm (slm=standard litre per minute according to the German standard DIN 1343) and 5.1 slm. The maximum rate of fuel gas flowing along the fuel supply tube, when controlled by the fuel gas valve 21, is preferably between 4 slm and 6 slm and particular preferably between 4.5 slm and 5.5 slm. The fuel gas valve 21 may be configured to control the rate of fuel gas flow by adjusting the size of an opening of a gas valve said valve being controlled by the electronic signal. As such, the size of the opening of the fuel gas valve 21 may be proportional to the electronic signal (energy) supplied to the electronic actuator of fuel gas valve 21.

Figure 6B:
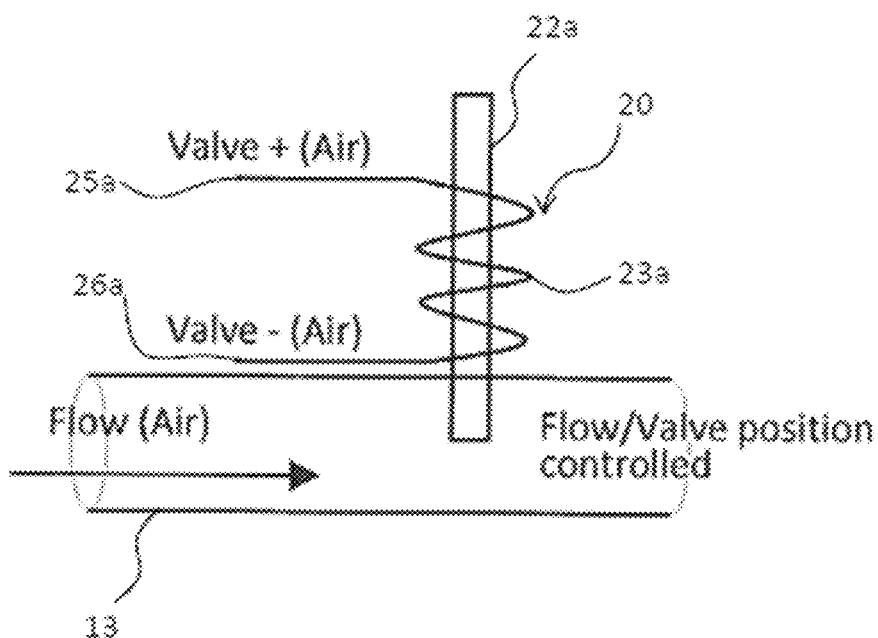
FIG. 6b shows a schematic diagram of an oxidant gas valve in a normal operation configuration.
Figure 9B:
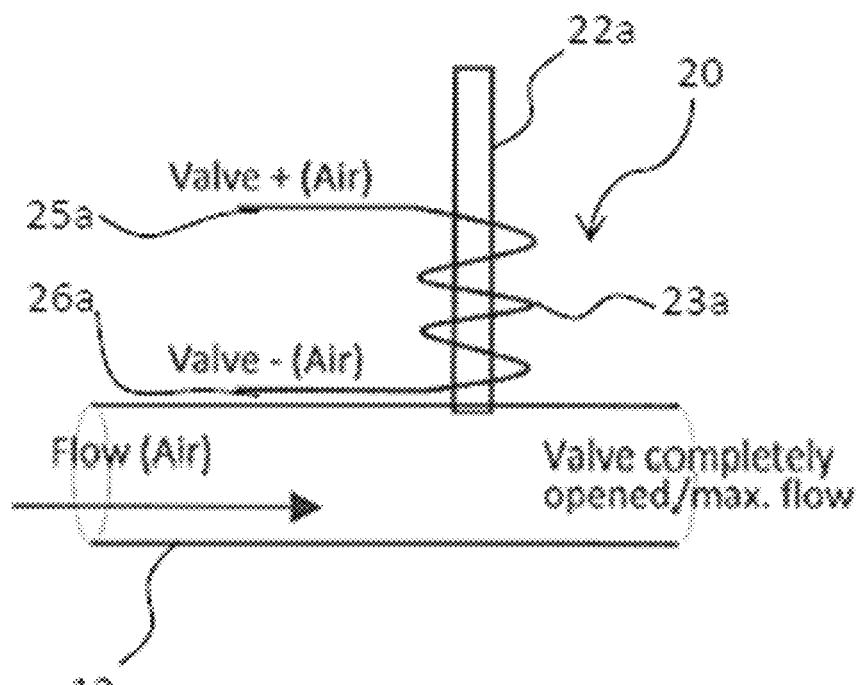
FIG. 9b shows a schematic diagram of an oxidant gas valve in a power failure configuration.

The supply of oxidant gas along oxidant supply tube 13 is controlled by an oxidant gas valve 20. An example of the oxidant gas valve 20 is shown in FIGS. 6b and 9b. Oxidant gas valve 20 may be an electronically actuated gas valve. As such oxidant gas valve 20 may be controlled (operated, actuated) by an electronic signal. Oxidant gas valve 20 is disposed at a point along oxygen supply tube 13 in order to control the flow of gas (i.e. the oxidant gas flow rate) along the oxidant supply tube 13. The oxidant gas valve 20 may be electronically controlled (actuated) to vary the rate of gas flow along the oxidant supply tube 13 for a range of different values of gas flow rate. For example, in one embodiment, the oxidant gas valve 20 may be provided to control the rate of oxidant gas flowing along the oxidant supply tube 13 between 0 slm and 7.8 slm. The maximum rate of oxidant gas flowing along the oxidant supply tube 13, when controlled by the oxidant gas valve 20, is preferably between 6 slm and 10 slm and particular preferably between 7.5 slm and 8.5 slm. As such, the oxidant gas valve 20 may be similar in construction and operation to the fuel gas valve 21 described above.

FIG. 6a shows a schematic diagram of a fuel gas valve 21 according to an embodiment of the disclosure. Fuel gas valve 21 is disposed at a point along the fuel supply tube 11 in order to variably control the flow rate along said fuel supply tube 11. Fuel gas valve 21 may be electronically actuated. As such, fuel gas valve 21 comprises an adjustable valve plug 22 configured to throttle the flow of the fuel gas and an electronic actuation means 23 which is configured to control the position of the adjustable valve plug 22. For example, the fuel gas valve 21 may be a solenoid valve, in which the electronic actuation means 23 may be a solenoid which in response to an electrical signal may apply a magnetic force on the adjustable valve plug 22 to change its position of the adjustable valve 22 such that the rate of flow of gas through gas supply tube 11 is adjusted. The fuel gas valve 21 may be configured to provide a range of different gas flow rates. For example, in one embodiment the fuel gas valve may be configured to provide a gas flow rate of between 0 slm and 5.1 slm, or more preferably between 0 slm and 3 slm.

Figure 8:
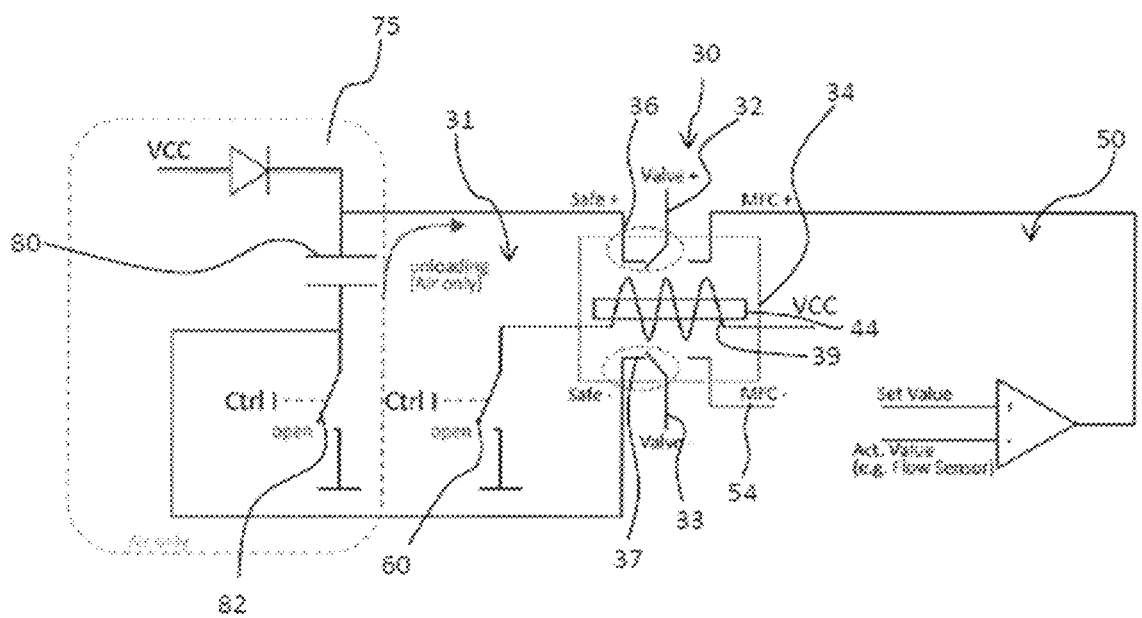
FIG. 8 shows a schematic circuit diagram of part of the gas supply system including an oxidant gas safety controller circuit according to an embodiment of this disclosure, the system being in a power failure configuration.

If no voltage difference is applied as electrical signal to the terminals 25, 26 of the solenoid 23 of the fuel gas valve 21 and therefore the solenoid 23 is not applying a magnetic force on the adjustable valve plug 22, the fuel gas valve 21 is closed because then the adjustable valve plug 22 is completely blocking the fuel supply tube 11 (as shown in FIG. 8).

Similarly, FIG. 6b shows a schematic diagram of an embodiment of an oxidant gas valve 20. The oxidant gas valve 20 is disposed at a point along oxidant supply tube 13 and is configured to variably control the rate of oxidant gas flow along said oxygen supply tube 13. The oxidant gas valve 20 may be constructed in a similar manner to the fuel gas valve 21. For example, the oxidant gas valve 20 may be a solenoid valve.

If no voltage difference is applied as electrical signal to the terminals 25a, 26a of the solenoid 23a of the oxidant gas valve 20 and therefore the solenoid 23a is not applying a magnetic force on the adjustable valve plug 22a, the oxidant gas valve 20 is closed because then the adjustable valve plug 22a is completely blocking the oxidant supply tube 13.

Figure 4:
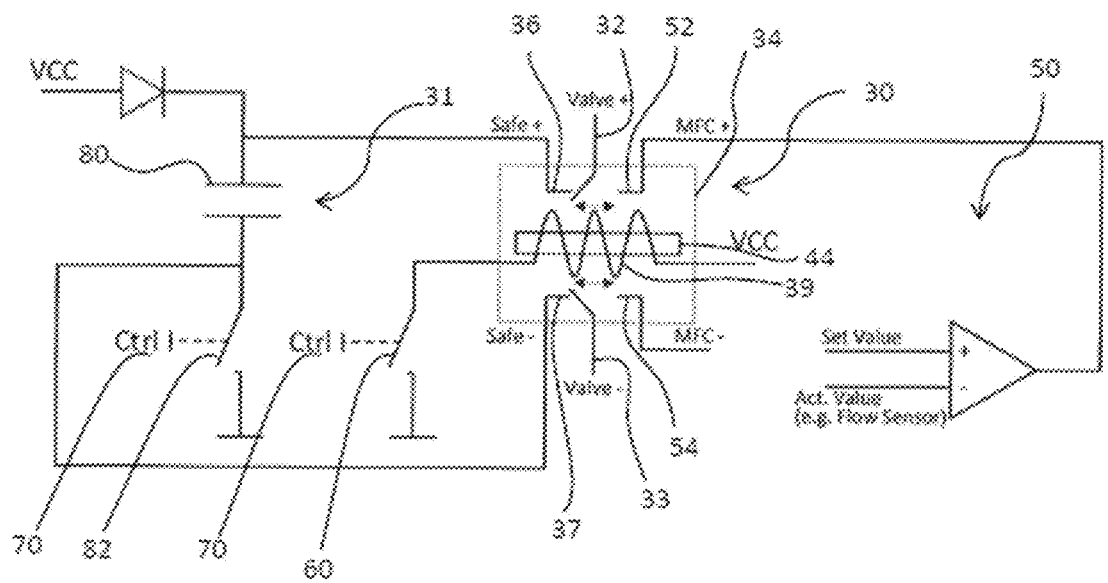
FIG. 4 shows a schematic circuit diagram of part of the gas supply system including an oxidant gas safety controller circuit according to an embodiment of this disclosure, the system being in a shutdown configuration.

FIG. 4 shows a schematic circuit diagram of part of the gas supply system including an oxidant gas safety controller 30 according to an embodiment of this disclosure. The oxidant gas safety controller 30 comprises oxidant gas valve control outputs 32, 33 which are configured to provide an electronic signal to the (electronically actuated) oxidant gas valve 20 in order to control said gas valve by opening and closing said gas valve. Preferably, by the provided electronic signal, the gas flow of the oxidant gas can be controlled, either in a stepwise manner or more preferably in a steplessly variable manner.

The oxidant gas safety controller 30 also comprises a relay 34 (switch). The relay 34 is configured to control the electrical connections within the oxidant gas safety controller 30 to the oxidant gas valve control outputs 32, 33. The relay 34 has a first position and second position. In the schematic diagram of FIG. 4 the relay 34 is shown in the first position. In the first position the relay 34 is configured to connect the oxidant gas valve control outputs 32, 33 to an oxidant shutdown circuit 31. As shown in FIG. 4, the first oxidant gas valve control output 32 is connected to a first shutdown terminal 36 and the second oxidant gas valve control output 33 is connected to a second shutdown terminal 37.

In the shutdown configuration shown in FIG. 4 (i.e. shut down circuit 31), the first shutdown terminal 36 is (directly) connected to the supply voltage (VCC) of the gas safety controller 30 such that the first shutdown terminal 36 is supplied with a voltage of VCC. The first shutdown terminal 36 and the second shut down terminal 37 are connected to a capacitor 80, which can be charged as a power source as explained later. If the capacitor is charged in the shutdown configuration, the capacitor will be discharged via first shutdown terminal 36 and the second shutdown terminal 37 being connected via the oxidant gas valve control outputs 32, 33 with the terminals 25a, 26a of the solenoid 23a of the oxidant gas valve 20. When the capacitor 80 has already been discharged, which is the situation when the gas supply system shown in FIG. 4 has not been used for a time, wherein the relay 34 is in its first position, the voltage across the oxidant gas valve control outputs 32, 33 in the shutdown configuration shown in FIG. 4 will be about 0V. The oxidant gas valve 20 in response to receiving an oxidant gas valve control output signal of 0V will be fully closed.

As shown in FIG. 4, the relay 34 of the oxidant gas safety controller 30 also includes first mass flow terminal 52 and second mass flow terminal 54. An oxidant gas flow control circuit 50 may be connected to the oxidant gas valve outputs 32, 33 by first mass flow terminal 52 and second mass flow terminal 54. In the embodiment shown in FIG. 4, the relay 34 is in the first position and so the oxidant gas flow control circuit 50 is not connected to the oxidant gas valve outputs 32, 33.

The relay 34 provides a means of electrically isolating the oxidant gas valve control outputs 32, 33 from the shutdown circuit 31 or the oxidant gas flow control circuit 50. In the embodiment shown in FIG. 4 the relay 34 is configured to connect the oxidant gas valve control outputs 32, 33 to one of the safety circuit 31, and the oxidant gas flow control circuit 50 and to isolate the oxidant gas valve control outputs 32, 33 from the other circuit it is not connected to. The relay performs this function by physically moving a set of contacts between a first position and a second position in order to establish an electrical connection with either the first and second shut down terminals 36, 37 or the first and second mass flow terminals 52, 54. For example, such a movement might be provided by a solenoid 39 of the relay 34. In the solenoid 39 is arranged a movable iron core 44 which is switching the contact of the oxidant gas valve control outputs 32, 33 of the oxidant gas safety controller 30. When the solenoid 39 of the relay 34 is unpowered the iron core 44 of the relay 34 relay is biased into the first position. The iron core 44 of the relay 34 may be biased into the first position by a spring or other elastic means. When to the solenoid 39 of the relay 34 a current is provided the solenoid may provide a force to the iron core 44 to remove the contacts of the relay 34 with the first and second shut down terminals 36, 37 and to contact the second position (mass flow terminals 52, 54). The operation of relays is well known in the art to the skilled person. The solenoid 39 of the relay 34 shown in FIG. 4 is connected at one end to the supply voltage VCC. The solenoid 39 of the relay 34 is connected at the other opposing terminal to a first control switch 60. The control switch 60 is provided between the solenoid 39 of the relay 34 and earth (0 V). As shown in FIG. 4 the control switch 60 is open such that no earth connection is made accordingly in the arrangement shown in FIG. 4. In the shutdown configuration, there is no voltage across the solenoid 39 of the relay 34 and so the ion core 44 of the relay 34 is in the first position.

The first control switch 60 is connected between solenoid 39 of the relay 34 and earth. The first control switch 60 configured to provide a conductive connection between solenoid 39 of the relay 34 and earth or alternatively to isolate the solenoid 39 of the relay 34 from earth. The control of the first control switch 60 is provided by a control signal input 70. As shown in the circuit diagram of FIG. 4, the first control switch 60 is provided in the open configuration in which the solenoid 39 of the relay 34 is isolated from earth. In the circuit diagram of FIG. 5 the first control switch 60 is provided in a closed configuration in which the solenoid 39 of the relay 34 is electrically connected to earth.

The oxidant gas safety controller 30 also includes an energy storage circuit 75. As shown in the circuit diagram of FIG. 4, the energy storage circuit 75 may comprise a capacitor 80 and a second control switch 82. The capacitor 80 and the second control switch 82 are arranged in series in an electrical circuit between VCC and earth. As shown in the circuit diagrams of FIGS. 4 and 5, the capacitor 80 (energy storage component) is connected between the first shut down terminal 36 and the second shut down terminal 37. That is to say, that any voltage across capacitor 80 will also be provided between the first and second shut down terminals 36, 37. The terminal of the capacitor 80 which is connected to the first shut down terminal 36 is also connected to the supply voltage VCC. The other opposing terminal of the capacitor 80 is also connected to one terminal of the second control switch 82. Control switch 82 is arranged in an electrical circuit between the second shut down terminal 37 and earth. As shown in the shutdown configuration in the circuit diagram of FIG. 4, the second control switch 82 is in an open configuration such that the second shut down terminal 37 is electrically isolated from the earth. In the configuration shown in FIG. 5, second control switch 82 is in a closed configuration. Accordingly, the second shut down terminal 37 and the terminal of the capacitor 80 to which it is connected are both connected to earth.

FIGS. 6a and 6b show the fuel gas valve 21 and the oxygen gas valve 20 in a partially open configuration. As such, each of the oxidant gas valve 20 and fuel gas valve 21 are in a configuration to allow passage of gas through the respective supply tubes 11, 13. In such a configuration, the oxidant gas valve 20 and fuel gas valve 21 are supplied with electrical energy in order to maintain the valves 20, 21 in a partially open configuration. The adjustable valves 22, 22a are normally resiliently biased to be closed when energy is not supplied to the electronic actuation means 23, 23a. That is to say, that in the absence of energy supplied to the electronic actuation means 23, 23a, the oxidant gas valve 20 and the fuel gas valve 21 are each configured to prevent the flow of gas.

The oxidant gas valve 20 may be configured to allow a greater maximum flow rate of fluid through the oxidant gas valve 20 than the maximum flow rate of fluid though the fuel gas valve 21. As such, when both the oxidant gas valve 20 and the fuel gas valve 21 are fully open, the fluid flow rate through the oxidant gas valve 20 may be greater than the fluid flow rate through the fuel gas valve 21. It some embodiments, it will be appreciated that the fuel gas valve 21 and the oxidant gas valve 20 may not be fully opened under normal operation, and so the increase in the oxidant gas flow rate 20 may be significantly larger than the corresponding decrease in fuel gas flow rate.

Similar to the oxidant gas safety controller 30, the gas supply system further comprises a fuel gas safety controller 40 for controlling the fuel gas valve 21.

Figure 7:
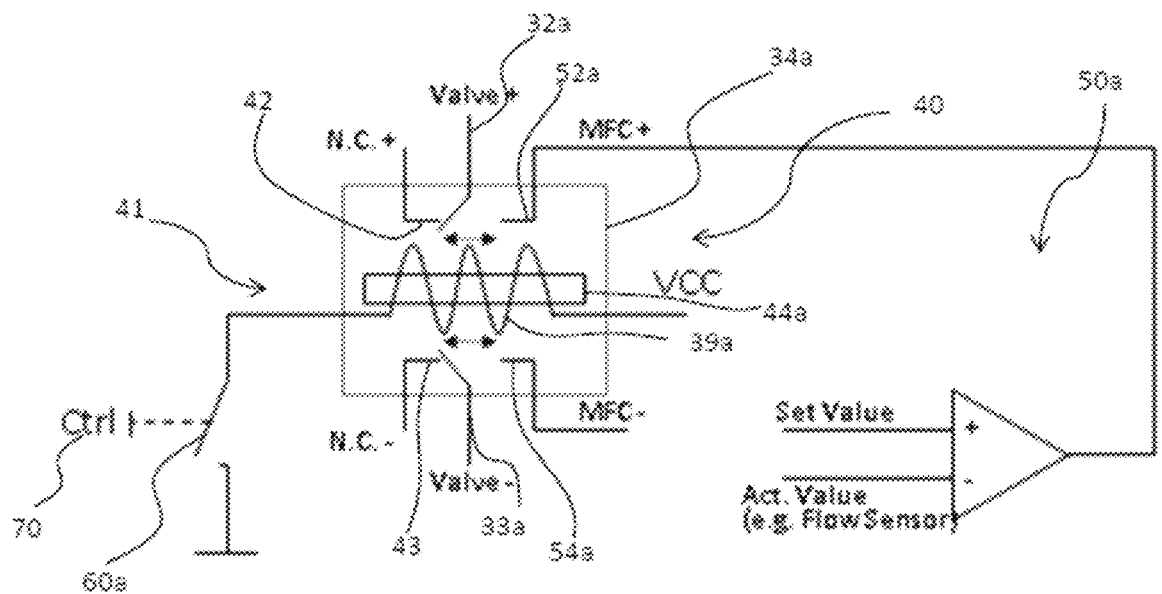
FIG. 7 shows a schematic circuit diagram of part of the gas supply system including a fuel gas safety controller according to an embodiment of this disclosure.

FIG. 7 shows a schematic circuit diagram of a part of the gas supply system including a fuel gas safety controller 40 according to an embodiment of this disclosure. The fuel gas safety controller 40 comprises fuel gas valve control outputs 32a, 33a which are configured to provide an electronic signal to (electronically actuated) fuel gas valve 21 in order to control said gas valve by opening and closing said gas valve. Preferably by the provided electronic signal also the gas flow of the fuel gas can be controlled, either stepwise but preferable steplessly variable.

The fuel gas safety controller 40 also comprises a relay 34a (switch). The relay 34a preferably comprises a solenoid 39a, in which is arranged a movable iron core 44a, which is switching the contact of the fuel gas valve control outputs 32a, 33a. The relay 34a is configured to control the electrical connections within the fuel gas safety controller 40 to the fuel gas valve control outputs 32a, 33a. The iron core 44a of the relay 34a has a first position and second position, similar to the iron core 44 of the relay 34 of the oxidant gas safety controller 30. In the schematic diagram of FIG. 7, the iron core 44a of the relay 34a is shown in the first position. In the first position the relay 34a is configured to connect the fuel gas valve control outputs 32a, 33a to a fuel shutdown circuit 41. As shown in FIG. 7, the first fuel gas valve control output 32a is connected a first fuel shutdown terminal 42 and the fuel second gas valve control output 33a is connected to the second fuel shutdown terminal 43.

In the shutdown configuration shown in FIG. 7 (i.e. shut down circuit 41), a short circuit or an open circuit can be provided between the first fuel shut down terminal 42 and the second fuel shut down terminal 43. As such, the shutdown circuit 41 may be a short circuit or an open circuit. The shutdown circuit is configured to cause the fuel gas valve 21 to close rapidly, preferably near instantaneously, in the event of a power failure. The short circuit or the open circuit of the embodiment achieves this effect as the fuel gas valve 21 may be a normally closed valve. If the shutdown circuit is an open circuit, it is advantageous to connect the terminals 25, 26 of the solenoid 23 of the fuel gas valve 21 additionally via a diode. Due to this no high charges can be arise which may induce sparks, when in the fuel gas valve control outputs 32a, 33a are in the situation of a power failure connected with the first fuel shut down terminal 42 and the fuel second shut down terminal 43. The diode is arranged in that way between the terminals 25, 26, that a voltage at the open circuit, which would keep open the fuel gas valve 21 is reduced immediately.

In other embodiments, the fuel shutdown circuit 41 may be any other circuit known to the skilled person arranged to cause the closure of the fuel gas valve 21 in the event of the power failure. For example, fuel shut down circuit 41 may include an earth connection between first shutdown terminal 42 and second shutdown terminal 43 or any other direct connection of the first shutdown terminal 42 and second shutdown terminal 43. As such, when the relay 34a is in the first position the first and second fuel gas valve outputs 32a, 33a may be connected to earth or their voltage difference is 0 V.

Thus it will be appreciated that in the fuel shutdown circuit 41 of the fuel gas safety controller 40, an energy storage circuit may not be present. It will be appreciated that in embodiments of this disclosure, the flame 19 of the flame module 1 in the event of a power failure is extinguished through control of the oxidant gas flow rate. As such, it will be appreciated that various different methods for controlling the shutdown of the fuel gas supply may be contemplated.

As shown in FIG. 7, the relay 34a of the fuel gas safety controller 40 also includes a first fuel mass flow terminal 52a and second fuel mass flow terminal 54a. A fuel gas flow control circuit 50a may be connected to the fuel gas valve outputs 32a, 33a by the first fuel mass flow terminal 52a and second fuel mass flow terminal 54a. In the embodiment shown in FIG. 7, the relay 34a is in the first position and so the fuel gas flow control circuit 50a is not connected to the fuel gas valve outputs 32a, 33a. When the relay is in the second position, the fuel gas flow control circuit 50a is connected to the fuel gas valve control outputs 32a, 33a in a similar manner to the oxidant gas flow circuit 50 to the oxidant gas safety controller 30 as described above.

The oxidant gas flow control circuit 50 and the fuel gas flow control circuit 50a may be provided as mass flow controllers. For example, a mass flow controller supplied by Bronkhorst High-Tech B. V. may be used as an oxidant gas flow control circuit 50 and/or a fuel gas flow control circuit 50a.

Next, a method of operating the flame module according to the present disclosure will be described with reference to the circuit diagrams in FIGS. 4, 5, 7, and 8.

FIG. 4 shows a circuit diagram of part of the gas supply system in a first shut down configuration. In the first shutdown configuration, the control signal 70 is 0 V. Thus, the first control switch 60 and the second control circuit 82 in the first shutdown configuration are effectively open circuits. In the shutdown configuration, the control signal 70 causes the first control switch 60 to be open (non-conductive). Thus, the solenoid 39 of the relay 34 is isolated from the ground such that no current flows from VCC through the solenoid 39 of the relay 34 to ground. Accordingly, the solenoid 39 of the relay 34 is unpowered, and so the iron core 44 of the relay 34 will be in the first position in which the first and second gas control outputs 32, 33 are connected to the first and second shut down terminals 36, 37. In such a configuration, first and second shut down terminals 36, 37 will be at the same voltage as both terminals are connected to VCC (albeit second shut down terminal 37 being connected to VCC through capacitor 80). Thus, in the shutdown configuration the safety circuit 31 is configured to provide substantially zero voltage difference (potential) across the oxidant gas valve control outputs 32, 33. Accordingly, the oxidant gas valve 20 will have no voltage across its terminals such that the oxidant gas valve 20 will be closed. Thus, no oxidant gas will flow through oxidant gas supply tube 13 in the shutdown configuration.

Similarly, as shown in FIG. 7, when the control signal 70 is 0V, control switch 60a is configured to be an open circuit. Thus, the relay 34a is isolated from the ground such that no current flows from VCC through solenoid 39a of the relay 34a to ground. Accordingly, solenoid 39a of the relay 34a is unpowered, and so the iron core 44a of the relay 34a will be in the first position in which the first and second fuel gas control outputs 32a, 33a are connected to the first and second fuel shutdown terminals 42, 43. In such a configuration, first and second shutdown terminals 42, 43 will be at the same voltage as a short circuit or an open circuit is provided between the terminals, as described above. Thus, in the shutdown configuration the shutdown circuit 41 is configured to provide substantially zero voltage difference (potential) across the fuel gas valve control outputs 32a, 33a. Accordingly, the fuel gas valve 21 will have no voltage across its terminals 25, 26 such that the fuel gas valve 21 will be closed. Thus, no fuel gas will flow through fuel gas supply tube 11 in the shutdown configuration.

Figure 5:
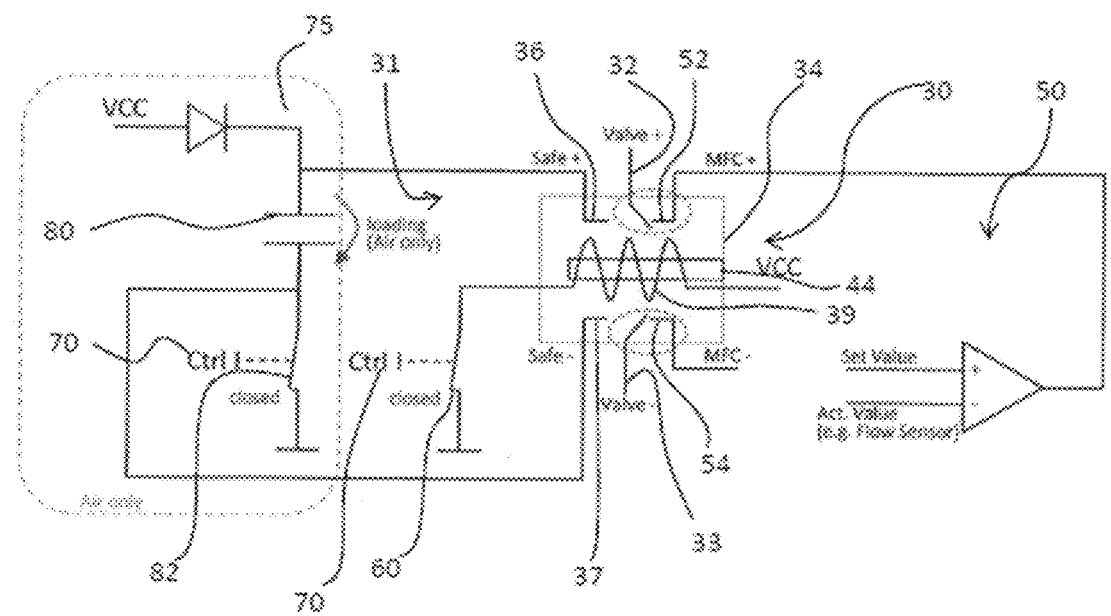
FIG. 5 shows a schematic circuit diagram of part of the gas supply system including an oxidant gas safety controller circuit according to an embodiment of this disclosure, the system being in a normal operation configuration.

FIG. 5 shows a configuration of the gas supply system in normal operation. It will be understood that normal operation is when the flame module is in use and gas is being supplied to the flame module. In such operation, the power supply (i.e. VCC) is operating normally at its intended voltage. As shown in FIG. 5, the normal operation of the gas safety controller 30 is triggered by closing the first and second control switches 60, 82. By closing first control switch 60, electrical current flows between the supply voltage VCC and earth through the solenoid 39 of the relay 34. Due to the current flowing through the solenoid 39 of the relay 34, the iron core 44 of the relay 34 moves to the second position in which the first and second oxidant gas valve control outputs 32, 33 are connected to the first and second mass flow terminals 52, 54. Thus the control value set by the oxidant gas flow controller 50 may supply a suitable electrical power (current, voltage) to the oxidant gas valve 20 in order to control its position. As such the oxidant gas controller 50 may set a desired oxidant gas flow rate for the oxidant gas supply tube 13. For example the oxidant gas controller 50 may set the oxidant gas valve 20 to be partially open as shown in FIG. 6b.

As shown in FIG. 5, the first and second shutdown terminals 36, 37 are not connected to the oxidant gas valve control outputs 32, 33 as the iron core 44 of the relay 34 is in the second position. In this configuration capacitor 80 is now connected between the supply voltage VCC and earth due to the closure of the second control switch 82. Thus, the capacitor 80 will charge up over time (store electrical energy). This energy will be maintained (stored) by capacitor 80 for as long as the supply voltage is maintained. The amount of electrical energy stored by the capacitor 80 will depend on the size of the capacitor.

In normal operation, the fuel gas safety controller 40 is operated similarly to the oxidant gas safety controller 30 as described above. The normal operation of the fuel gas safety controller 40 is triggered by closing the control switch 60a, which moves the iron core 44a of the relay 34a to the second position. Thus, a control value set by the fuel gas flow controller 50a may set a desired fuel gas flow rate for the fuel gas supply tube 11. For example the fuel gas controller 50a may set the fuel gas valve 21 to be partially open as shown in FIG. 6a.

It will be appreciated that in normal operation, the control values set by the oxidant gas flow controller 50 and the fuel gas flow controller 50a may be varied to adjust the fuel gas and oxidant gas mixture supplied to the flame module 1. As such, degree of opening of the oxidant gas valve 20 and the fuel gas valve 21 may be varied, and is not limited to only being fully open or fully closed. Each of the fuel gas flow controller 50a and the oxidant gas flow controller 50 may be controlled by a further controller, and/or directly by a user to specify the desired flow rates.

FIG. 8 shows a circuit diagram of the oxidant gas safety controller 30 in the event of a power failure. In the event of a power failure, it will be appreciated that the supply voltage VCC and the control signal 70 will no longer supply electrical energy to the oxidant gas safety controller 30. Thus the first control switch 60 will revert to the open configuration such that the relay 34 is isolated from earth. Accordingly, in the absence of a voltage drop across the solenoid 39 of the relay 34 the iron core 44 of the relay 34 reverts to the first position. Thus, the oxidant gas valve control outputs 32, 33 will transition from being connected to the mass flow terminals 52, 54 to being connected to the shutdown terminals 36, 37. Once connected to the first and second shutdown terminals 36, 37, electrical energy will be supplied to the oxidant gas valve control outputs 32, 33 by the capacitor 80. It will be appreciated that capacitor 80 which was previously charged between the supply voltage VCC and earth will supply electrical energy, initially at a voltage substantially similar to the supply voltage VCC.

Capacitor 80 is configured to supply sufficient electrical energy to the oxidant gas valve 20 to increase the gas flow rate of oxidant gas through the oxidant gas supply tube 13. For example, in the embodiment shown in FIG. 9b the capacitor 80 provides sufficient electrical energy to fully open the oxidant gas valve 80. By increasing the oxidant gas flow rate, the flame of the flame module may be extinguished due to the step change in oxidant gas flow rate. Preferably, the size of the capacitor is chosen to fully open the valve, and keep the valve open for a period of at least 1 second, preferably at least 2, or more preferably at least 3 seconds. For, example a capacitor of at least 40 mF may be sufficient to fully open the oxidant gas flow valve 20 for the desired duration. Of course, the skilled person will appreciate that the choice of capacitor will depend on the resistances of the circuit and the valve, and so other values of capacitor 80 may be suitable.

As shown in FIG. 9a, in the event of a power failure, the electronic actuation means 23a for fuel gas flow valve 21 will be unpowered. This in turn will cause the fuel gas flow valve 21 to close, resulting in the supply of fuel gas to the spray chamber 5 being shut off.

Preferably, the total gas flow rate (i.e. the total of the oxidant gas flow rate and the fuel gas flow rate) when extinguishing the flame is no less than the total gas flow rate when the gas supply system is in normal operation.

Preferably, in the event of a power failure, the rate of change (i.e. rate of increase) of the oxidant gas flow rate is greater than the absolute rate of change (i.e. absolute rate of decrease) of the fuel gas flow rate in order to extinguish the flame. It will be appreciated that such an inequality applies during the time period in which the fuel gas valve 21 is closing and the oxidant gas valve 20 is further opening, up until the gas valves are substantially at their limits (i.e. the oxidant gas valve 20 is fully open and the fuel gas valve 21 fully closed). For example, the inequality may apply during a time period which is up to 90% of the time taken for the fuel gas valve 21 to close. Alternatively, the inequality may apply during a time period which is up to 80%, 70%, 60% or 50% of the time taken for the fuel gas valve 21 to close. The skilled person will appreciate that as the gas valves reach the limits of their motion, the rate of change of the gas flow may be further restricted, or influenced by the characteristics of the valves, in particular their type and shape, and/or the gas supply tube.

After a period of time, it will be understood that the energy stored in the capacitor will become depleted, and so the amount of power supplied to the oxidant gas valve may decrease after a brief period. Thus, after an initial period in which the oxidant gas valve 20 is biased to be fully open by the capacitor 80, the oxidant gas valve 20 will then subsequently slowly close as the electrical energy stored in that capacitor 80 decays.

In the event of a power failure, the fuel gas safety controller 40 is configured to close the fuel gas valve 21. With reference to the diagram in FIG. 7, it will be appreciated that in the event of a power failure, the supply voltage VCC and the control signal 70 will no longer supply electrical energy to the fuel gas safety controller 40. Thus the control switch 60a will revert to the open configuration such that the solenoid 39a of the relay 34a is isolated from earth. Accordingly, in the absence of a voltage drop across solenoid 39a of the relay 34a, the iron core 44a of the relay 34a reverts to the first position. Thus, in configuration shown in FIG. 7, an open circuit is formed between the first and second shut down terminals 42, 43 reducing the voltage at the terminals 25, 26 of the solenoid 23 of the fuel gas valve 21 rapidly and so the fuel gas valve 21 will close, as shown in FIG. 9a.

Figure 10:
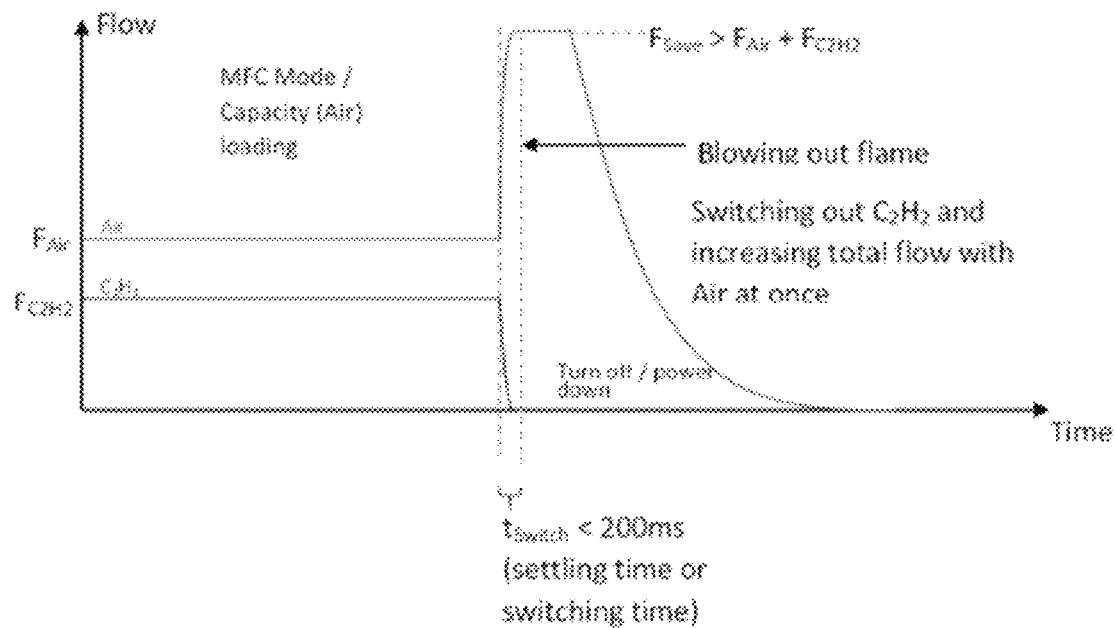
FIG. 10 shows a graphical diagram of a typical change in flow rate of oxidant gas (air) and fuel gas (acetylene) over time in the event of a power failure.

FIG. 10 shows a graphical diagram of a typical change in the flow rates of oxidant gas (air) and fuel gas (acetylene) over time in the event of a power failure. Under normal operation, the oxidant gas flow rate ($F_{Air}$) and the fuel gas flow rate ($F_{C2H2}$) may be in a steady state. As shown in FIG. 10, due to the operation of the oxidant gas safety controller 30, the capacitor 80 initially provides power to the oxidant gas valve 20 to increase the oxidant gas flow rate by increasing the opening of the valve as shown in FIG. 9b. The capacitor 80 subsequently discharges over time such that the power (voltage, current) supplied to the oxidant gas valve 20 decreases, causing the oxidant gas valve to gradually close, thereby reducing the oxidant gas flow rate. Accordingly, after a period of time the system reverts to the shutdown configuration shown in FIG. 4. Typically, the oxidant gas safety controller 30 is configured to provide an increase in the flow rate of the oxidant gas such that the oxidant gas flow rate in the event of a power failure ($F_{Save}$) (i.e. when the oxidant gas valve 20 is fully open) is greater than the total gas flow rate under normal operation ($F_{Air}$+$F_{C2H2}$). Thus, in the event of a power failure, the total gas flow rate through the spray chamber 5 may be briefly increased while the flame is extinguished.

Preferably, the oxidant gas safety controller 30 is configured to provide an increase in the flow rate of the oxidant gas such that the oxidant gas flow rate in the event of a power failure ($F_{Save}$) is 1.2 times greater than the total gas flow rate under normal operation ($F_{Air}$+$F_{C2H2}$). More preferably, the oxidant gas safety controller 30 is configured to provide an increase in the flow rate of the oxidant gas such that the oxidant gas flow rate in the event of a power failure ($F_{Save}$) is 1.5 times greater than the total gas flow rate under normal operation ($F_{Air}$+$F_{C2H2}$). Particularly preferably, the oxidant gas safety controller 30 is configured to provide an increase in the flow rate of the oxidant gas such that the oxidant gas flow rate in the event of a power failure ($F_{Save}$) is 2 times greater than the total gas flow rate under normal operation ($F_{Air}$+$F_{C2H2}$).

As discussed above, the operation of the fuel gas safety controller 40 is substantially the same as the oxidant gas safety controller 30 for the shutdown configuration and the normal operation shown in circuit diagrams of FIGS. 4 and 5. It will be appreciated that the presence of capacitor 80 does not substantially affect the operation of the oxidant gas flow safety circuit 30 in either of the configurations in FIG. 4 or 5. In the event of a power failure, the relay 34a which controls the fuel gas flow safety controller 40 for the fuel gas valve 21 will operate in a similar manner as described the oxidant gas valve 20. Once the fuel gas valve 21 is connected to the first and second fuel shutdown terminals 42, 43, no voltage is provided across the solenoid 23 of the fuel gas valve 21. Thus, the fuel gas valve 21 will close relatively quickly (compared to the oxidant gas valve 20). For example, the fuel gas valve may close in a time no greater than 300 ms from a power failure. More preferably, the valve may be arranged to close within a time no greater than 200 ms from a power failure, and particularly preferably within a time no greater than 100 ms from a power failure. Thus, the supply of fuel gas to the spray chamber 5 may be shut off relatively rapidly in parallel with the flame being blown out due to the increase in the supply of oxidant gas. As such, it will be appreciated that there is a differential treatment of the fuel gas valve 21 and the oxidant gas valve 20. In particular, by shutting off the fuel gas supply rate rapidly, this further ensures that the flame is extinguished rapidly. This further reduces the risk of a flashback occurring.

FIG. 10 shows a graphical diagram of the flow rate of acetylene gas $C_2H_2$ (fuel gas) in the event of a power failure. As shown in the diagram, after a time at which a power failure occurs, the fuel gas flow rate rapidly decreases due to the closing of the fuel gas valve 21. Once the fuel gas valve 21 has closed it will be appreciated that the fuel gas safety controller 40 for the fuel gas valve 21 has reverted to the configuration as shown in FIG. 7 (i.e. the shutdown configuration).

It will be appreciated, as indicated in FIG. 10 that the method for controlling the shutdown of the flame module 1 by the oxidant gas safety controller 30 and the fuel gas safety controller 40 in the event of a power failure, may be equally applicable to a controlled shutdown process in which the supply voltage to the control module is intentionally removed.

Figure 11:
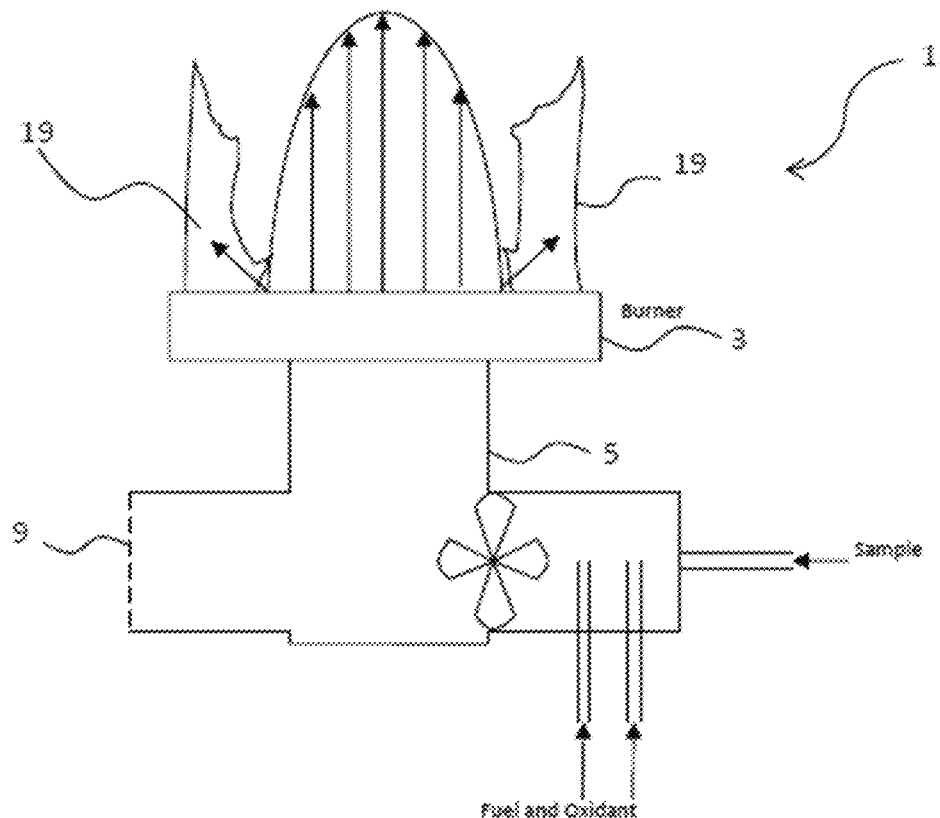
FIG. 11 shows a schematic diagram of a flame module undergoing a shutdown procedure in which the flame is in the process of being extinguished.

FIG. 11 shows a schematic diagram of a flame module 1 undergoing a shutdown procedure in which the flame 19 is in the process of being extinguished. The increase in the oxidant gas flow rate results in the flame 19 initially being extinguished in a generally central region of the burner head 3 according to the fluidic boundary layer effect. As the oxidant gas continues to flow through the burner head 3 at an increased rate, the flame 19 at the peripheral regions of the burner head 3 is also extinguished. The entire extinction process occurs over a relatively short period of time (i.e. less than 500 ms) such that the flame 19 may be rapidly extinguished in the event of a power failure. For example, the shutdown of the fuel gas flow may apply in the first 200 ms, or 300 ms following a power failure, such that the flame is extinguished. The skilled person will appreciate that as the gas valves reach the limits of their motion, the rate of change of the gas flow may be further restricted, or influenced by the characteristics of the valves, in particular their type and shape, and/or the gas supply tube.

Figure 12:
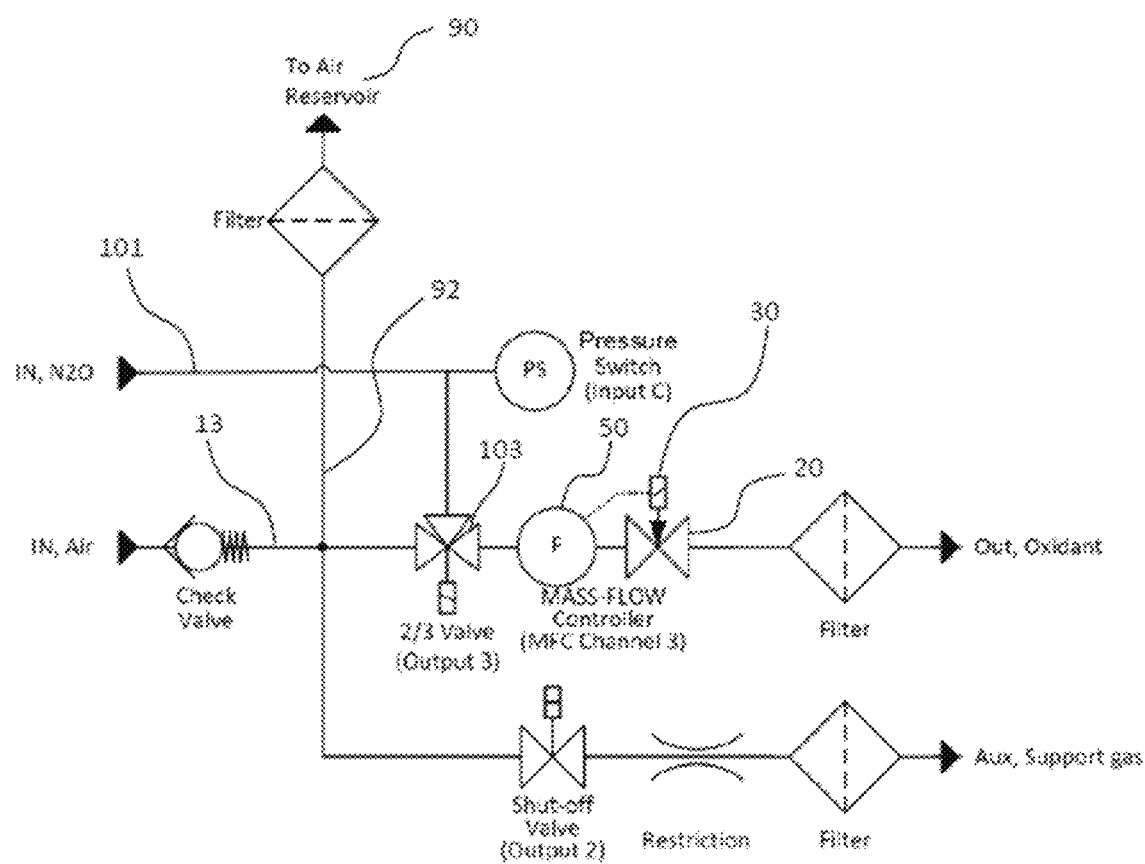
FIG. 12 shows a schematic system diagram of part of a gas supply system according to an alternative embodiment of the disclosure.

In an alternative embodiment of the invention the flame module 1 may also be provided with an alternative supply of oxidant gas. For example, FIG. 12 provides a schematic system diagram of part of a gas supply system according to an alternative embodiment of the disclosure. In the alternative embodiment of FIG. 12, alternative oxidant gas may be supplied by alternative oxidant supply tube 101. Alternative oxidant supply tube 101 may be connected to the oxidant gas supply tube 13 at a point upstream of the oxidant gas valve 20. The connection between the oxidant supply tube 13 and alternative oxidant supply tube 101 may be provided by a three way valve 103. Three way valve 103 is configured to control the supply of gas to the oxidant gas valve 20. In a first position of three way valve 103, oxygen supply tube 13 may supply oxidant gas to the oxidant gas valve 20. In the first position, the flow of alternative oxidant gas on alternative oxidant supply tube 101 is blocked by the three way valve 103. In a second configuration of the three way valve 103, oxidant supply tube 13 is blocked by the three way valve 103 and the alternative oxygen supply tube 101 supplies alternative oxidant gas to the oxidant gas valve 20. As such, it will be appreciated that in this alternative embodiment, the spray chamber 5 may be supplied with a supply of oxidant gas from supply tube 13 or an alternative oxidant gas through alternative oxidant supply tube 101. For example, in one particularly preferred embodiment the oxidant supply tube 13 may provide a supply of air (compressed air), while the alternative oxidant supply tube 101 provides a supply of nitrous oxide gas. This allows the flame module 1 to produce flames with a range of different temperatures.

In such an alternative embodiment, the gas supply system/oxidant gas safety controller 30 may also be configured to control the three way valve 103. For example, the oxidant gas safety controller 30 may also be configured to ensure that, in the event of a power failure, a particular oxidant gas is used to extinguish the flame. For example, it may be preferable to use a less oxidising gas to extinguish the flame. In the alternative embodiment, the oxidant gas safety controller 30 is also configured to switch the three way valve 103 to the first position to supply a first oxidant gas (air) to the oxidant gas valve 20 in the event of a power failure. A relay may be used to switch between a first and second gas based on a control signal. In the case of a power failure, the relay will switch to that position, that the particular oxidant gas used to extinguish the flame is supplied to the oxidant gas valve 20, which can be in the alternative embodiment the first oxidant gas (air).

In some embodiments of the invention, an oxidant gas reservoir 90 for the oxidant gas supply may also be provided. The oxidant gas reservoir 90 may be provided at an upstream location of the oxidant gas valve 20. The oxidant gas reservoir 90 is configured to provide a reserve supply of oxidant gas for maintaining pressure in the oxygen supply line in the event of a failure of the main supply. As such, the oxidant gas reservoir 90 may provide a secondary supply of oxidant gas in the event of a power failure.

As shown in the alternative embodiment in FIG. 12, the oxidant gas reservoir 90 may be located upstream of the oxidant gas valve 20. The oxidant gas reservoir 90 may also be located upstream of the three way valve 103. The oxidant gas reservoir 90 may be provided on a branching path 92 of the oxidant gas supply tube 13. As such, the supply of oxidant gas to the flame module may also be used to fill the oxidant gas reservoir 90 in use. In the event of a power failure, the oxidant gas stored in the oxidant gas reservoir 90 may be used to provide at least some of the increase in the oxidant gas flow rate for extinguishing the flame.

Accordingly, a gas supply system may be provided for a flame module of a spectrometer, in particular of an AAS or AES. The gas supply system of this disclosure aims to provide a gas supply system which reduces and/or eliminates the risk of flashback occurring in the event of a power failure. In this description, the gas supply system of this disclosure has been described by way of the exemplary embodiments. However, the present disclosure and the claims are not limited to these exemplary embodiments, and features described above in the exemplary embodiments may be combined to provide other types of gas supply systems for flame modules, as will be appreciated by the skilled person.

It shall be emphasised that though the whole gas supply system has been described comprising electromagnetic components and circuits for supplying the valves and controlling the valves, supplying and controlling of the valves can be also executed at least partly by hydraulic, pneumatic or mechanical components.

The invention claimed is:

1. A gas supply system for a flame module of a spectrometer comprising:
 a oxidant gas supply line for providing a supply of oxidant gas;
 an oxidant gas flow valve for varying a gas flow rate of an oxidant gas in the oxidant gas supply line;
 an oxidant gas safety controller configured to control the oxidant gas flow valve comprising:
  a first switch; and
  an energy storage circuit;
 a fuel gas supply line for providing a supply of fuel gas;
 a fuel gas flow valve configured to control a gas flow rate of a fuel gas on the fuel gas supply line; and
 a fuel gas safety controller configured to control the fuel gas flow valve, wherein
 during normal operation, the oxidant gas safety controller is configured to charge the energy storage circuit; and
 in the event of a power failure, the first switch of the oxidant gas safety controller is configured to connect the energy storage circuit to the oxidant gas flow valve, wherein the energy storage circuit is configured to discharge energy to the oxidant gas flow valve to increase the oxidant gas flow rate in order to extinguish a flame of the flame module, and the fuel gas safety controller is configured to close the fuel gas flow valve.

2. The gas supply system according to claim 1 further comprising:
an oxidant gas flow controller for setting the gas flow rate of oxidant gas in the oxidant gas supply line, the oxidant gas flow controller connected to the oxidant gas safety controller;
wherein, during normal operation, the first switch of the oxidant gas safety controller is configured to connect the oxidant gas flow controller to the oxidant gas flow valve.

3. The gas supply system according to claim 1, wherein the fuel gas safety controller further comprises:
a second switch; and
a fuel gas safety circuit;
wherein in the event of a power failure, the second switch of the fuel gas safety controller is configured to connect the fuel gas safety circuit to the fuel gas flow valve to close the fuel gas flow valve.

4. The gas supply system according to claim 3 wherein the fuel gas safety circuit is an open circuit or a short circuit.

5. The gas supply system according to claim 3, further comprising:
a fuel gas flow controller for setting the gas flow rate of the fuel gas in the fuel gas supply line;
wherein, during normal operation, the second switch of the fuel gas safety controller is configured to connect the fuel gas flow controller to the fuel gas flow valve.

6. The gas supply system according to claim 1, wherein the oxidant gas flow controller and/or the fuel gas flow controller is a mass flow controller.

7. The gas supply system according to claim 1, wherein the oxidant gas safety controller and/or the fuel gas safety controller further comprises a control signal input configured to receive a control signal,
the oxidant gas safety controller and/or the fuel gas safety controller configured to operate the first and/or second switches from the respective first positions to the respective second positions in response to receiving the control signal.

8. The gas supply system according to claim 1, further comprising
an alternative oxidant gas supply line for providing a supply of an alternative oxidant gas;
a three way valve arranged upstream of the oxidant gas valve connected to the oxidant gas supply line and the alternative oxidant gas supply line;
a third switch connected to the three way valve;
wherein
during normal operation, the third switch is configured to control the three way valve to fluidly connect either the oxidant gas supply line or the alternative oxidant gas supply line to the oxidant gas valve, and
in the event of a power failure, the third switch is configured to control the three way valve to fluidly connect the oxidant gas supply line to the oxidant gas valve.

9. The gas supply system according to claim 8, wherein the first switch, the second switch and/or the third switch is a relay.

10. The gas supply system according to claim 1, wherein the first energy storage circuit comprises a capacitor.

11. The gas supply system according to claim 1 for a flame module of an atomic absorption spectrometer or an atomic emission spectrometer.

12. An oxidant gas safety controller for a flame module comprising:
an oxidant gas valve signal output configured to output an oxidant gas valve signal to an oxidant gas valve for controlling the flow rate of an oxidant gas through the oxidant gas valve;
a first switch;
a first energy storage circuit;
wherein
the oxidant gas safety controller is configured to charge the first energy storage circuit when the first switch is powered; and
the oxidant gas safety controller is configured to discharge the first energy storage circuit through the oxidant gas valve output as the oxidant gas valve signal to increase the flow rate of the oxidant gas through the oxidant gas valve when the first switch is switched from a powered state to an unpowered state.

13. The oxidant gas safety controller according to claim 12, further comprising
an oxidant gas valve controller input configured to receive an oxidant gas valve controller signal from an oxidant gas valve controller for controlling the flow rate of the oxidant gas through the oxidant gas valve;
wherein when the first switch is powered, the oxidant gas safety controller is configured to output the oxidant gas valve controller signal as the oxidant gas valve signal.

14. A gas safety control system for a flame module comprising:
an oxidant gas safety controller configured to charge a first energy storage circuit when a first switch is powered, and configured to discharge the first energy storage circuit through an oxidant gas valve output as an oxidant gas valve signal to increase the flow rate of the oxidant gas through the oxidant gas valve when the first switch is switched from a powered state to an unpowered state; and
a fuel gas safety controller comprising:
a fuel gas valve signal output configured to output a fuel gas valve signal to a fuel gas valve for controlling a flow rate of a fuel gas through the fuel gas valve;
a second switch;
wherein when the second switch of the fuel gas safety controller is not powered, the fuel gas safety controller is configured to close the fuel gas flow valve.

15. The gas safety control system according to claim 14, wherein the fuel gas safety controller further comprises:
a fuel gas valve controller input configured to receive a fuel gas valve controller signal from a fuel gas valve controller for controlling the flow rate of the fuel gas through the fuel gas valve;
wherein when the second switch is powered, the fuel gas safety controller is configured to output the fuel gas valve controller signal as the fuel gas valve signal.

\* \* \* \* \*